(12) United States Patent
Yi et al.

(10) Patent No.: US 7,870,181 B2
(45) Date of Patent: Jan. 11, 2011

(54) CHINESE ABACUS ADDER

(75) Inventors: Shu-Chung Yi, Changhua (TW); Zih-Yi Jhao, Changhua (TW); Yu-Jhih Ye, Changhua (TW); Yen-Ju Chen, Changhua (TW); Yi-Jie Lin, Changhua (TW); Chien-Hung Lin, Changhua (TW)

(73) Assignee: National Changhua University of Education, Changhua (TW)

( * ) Notice: Subject to any disclaimer, the term of this patent is extended or adjusted under 35 U.S.C. 154(b) by 911 days.

(21) Appl. No.: 11/748,082

(22) Filed: May 14, 2007

(65) Prior Publication Data

US 2008/0118898 A1   May 22, 2008

(30) Foreign Application Priority Data

Nov. 16, 2006 (TW) ............................... 95142452 A

(51) Int. Cl.
*G06F 7/485* (2006.01)

(52) U.S. Cl. .................................................... 708/670
(58) Field of Classification Search ...................... None
See application file for complete search history.

(56) References Cited

U.S. PATENT DOCUMENTS

| 3,809,872 | A | * | 5/1974 | Yamamura et al. | 708/674 |
| 5,699,287 | A | * | 12/1997 | Ng et al. | 708/683 |
| 6,226,664 | B1 | * | 5/2001 | Ng et al. | 708/683 |
| 2007/0271326 | A1 | * | 11/2007 | Li et al. | 708/700 |
| 2008/0118898 | A1 | * | 5/2008 | Yi et al. | 434/201 |

* cited by examiner

*Primary Examiner*—David H Malzahn
(74) *Attorney, Agent, or Firm*—Rosenberg, Klein & Lee

(57) ABSTRACT

A Chinese abacus adder is disclosed. The Chinese abacus adder includes a B/A (binary to abacus) circuit, a P/A (parallel addition) circuit and a T/B (thermometric to binary) circuit. The Chinese abacus adder has a multiple radix calculating structure, which could reduce power consumption of the system and lower the calculation delay time.

3 Claims, 8 Drawing Sheets ically in Eastern society. However, the theory of the Chinese abacus was only applied to the abacus adder circuit of the adder in 1998.

CHINESE ABACUS ADDER

RELATED APPLICATIONS

The application claims priority to Taiwan Application Serial Number 95142452, filed Nov. 16, 2006, which is herein incorporated by reference.

BACKGROUND

1. Field of Invention

The present invention relates to a Chinese abacus adder. More particularly, the present invention relates to a Chinese abacus adder that has a multiple radix.

2. Description of Related Art

An Adder is a very important operational unit in an Arithmetic Logic Unit. The most common Ripple Carry Adders and Carry Look-ahead Adders are used in many related fields and applications.

The Chinese abacus is one of the most widely used arithmetic devices used historically in Eastern society. However, the theory of the Chinese abacus was only applied to the abacus adder circuit of the adder in 1998.

Franco Maloberti and Chen Gang proposed a circuit structure that included four parts: (1) a B/T (binary to thermometric) circuit, (2) an up shifter (US), (3) a T/A (thermometric to abacus) circuit and (4) an A/B (abacus to binary) circuit. Each part can only do a 2-bit adding operation of A plus B. If it is applied to multiple-bit operational circuits, it is necessary to occupy a large circuit area and the number of elements are also increased. The power consumption of all the circuits and the operational speed are also influenced.

In addition, designing a known high-bit fast adder such as the behavior mode of a carry look-ahead adder is described by the following equations (a), (b) and (c):

$$G_i = A_i B_i \quad (a)$$

$$P_i = (A_i \oplus B_i) \quad (b)$$

$$C_{i+1} = G_i + P_i C_i \quad (c)$$

Most of operational units are 32-bit or 64-bit nowadays so the aforementioned circuit structures are unsuitable for current ALU. Embodiments according to the present invention achieve the circuit functions described by equations (a), (b) and (c), and combine with multiple abacus adders to form a high-bit fast abacus adder.

SUMMARY

An object of the present invention is to provide a Chinese abacus adder. The Chinese abacus adder in accordance with the present invention includes multiple B/A (binary to abacus) circuits, multiple parallel addition circuits and multiple T/B (thermometric to binary) circuits.

The B/A (binary to abacus) circuits translate binary inputs to hexadecimal abacus signals. The parallel addition circuits sum up hexadecimal abacus signals to become thermometric codes. The T/B (thermometric to binary) circuits translate thermometric codes to binary outputs.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
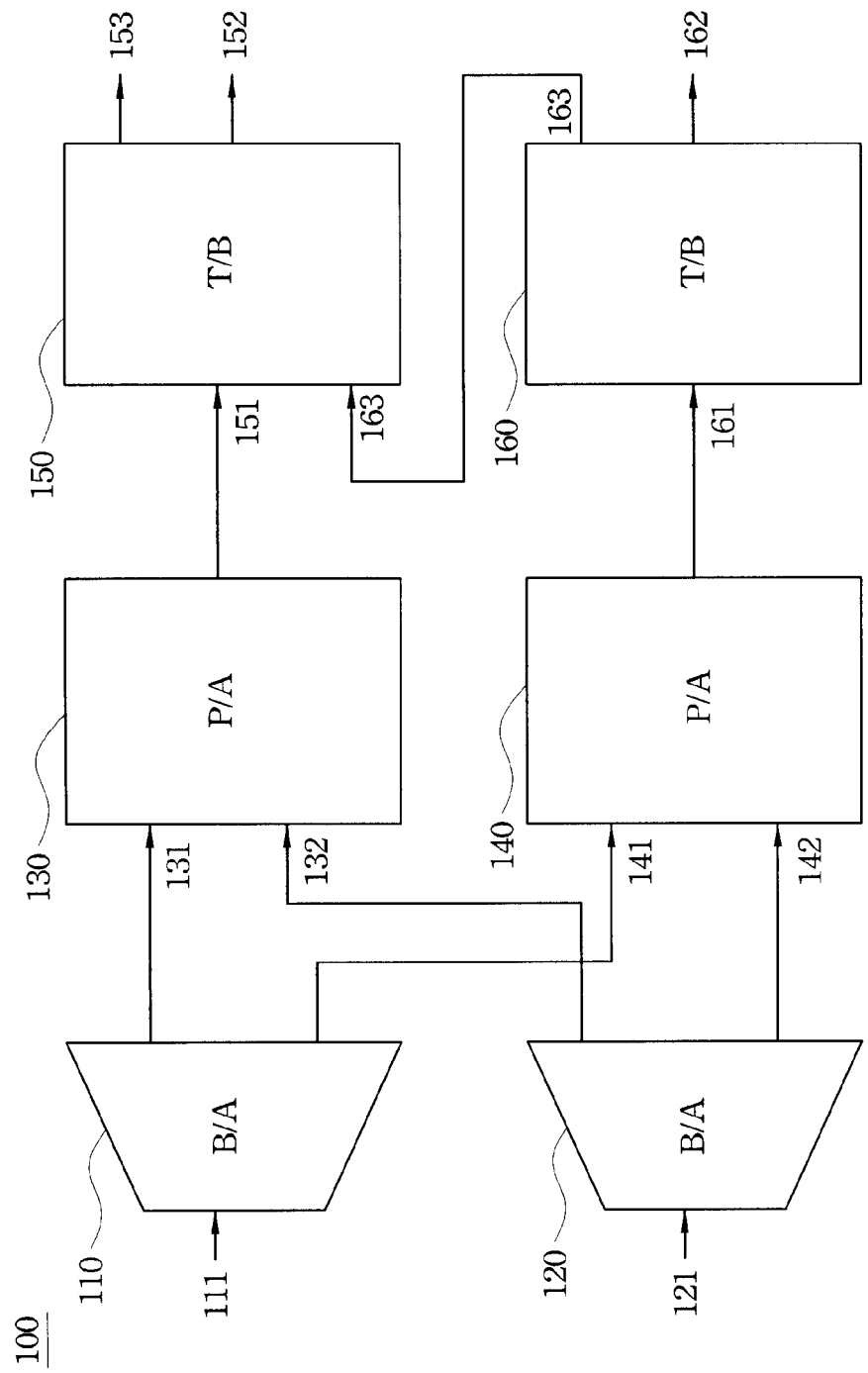
FIG. 1 is a block diagram of an embodiment of a Chinese abacus adder in accordance with the present invention.

Reference will now be made in detail to the present preferred embodiments of the invention, examples of which are illustrated in the accompanying drawings. Wherever possible, the same reference numbers are used in the drawings and the description to refer to the same or like parts.

Refer to FIG. 1. FIG. 1 illustrates a Chinese abacus adder in accordance with the present invention. The Chinese abacus adder in accordance with the present invention includes a first B/A (binary to abacus) circuit 110, a second B/A (binary to abacus) circuit 120, a first P/A (parallel addition) circuit 130, a second P/A (parallel addition) circuit 140, a first T/B (thermometric to binary) circuit 150 and a second T/B (thermometric to binary) circuit 160.

The first B/A (binary to abacus) circuit 110 and the second B/A (binary to abacus) circuit 120 translate binary inputs to hexadecimal abacus signals. The hexadecimal abacus signals include upper beads and lower beads. There are three outputs in the upper beads, and each output represents the numeral four in the decimal system. There are three outputs on the lower beads, and each output represents the numeral one in the decimal system.

Both binary inputs 111 and binary inputs 121 are four-bit binary numbers $(b_3 b_2 b_1 b_0)$. If the binary numbers $(b_3 b_2 b_1 b_0)$ must be translated into abacus signals $(H_2 H_1 H_0 | L_2 L_1 L_0)$, the abacus signals $(H_2 H_1 H_0)$ represent upper beads output signals and $(L_2 L_1 L_0)$ represent lower beads output signals, the relation between $(b_3 b_2 b_1 b_0)$ and $(H_2 H_1 H_0 | L_2 L_1 L_0)$ is described by equation (1) and equation (2) below:

$$H_2 = b_3 b_2, \ H_1 = b_3, \ H_0 = b_3 + b_2 \quad (1)$$

$$L_2 = b_1 b_0, \ L_1 = b_1, \ L_0 = b_1 + b_0 \quad (2)$$

where $0 \leq H_2 \leq H_1 \leq H_0 \leq 1$ and $0 \leq L_2 \leq L_1 \leq L_0 \leq 1$.

The first P/A (parallel addition) circuit 130 calculates the results of the upper bead outputs and the second P/A (parallel addition) circuit 140 calculates the results of the lower bead outputs. An abacus signal 131 and an abacus signal 132 are all the results of the upper beads output. If the format of the abacus signal 131 is $(H_{2A} H_{1A} H_{0A})$ and the format of the abacus signal 132 is $(H_{2B} H_{1B} H_{0B})$, the total output of both becomes thermometer code $(K_5 K_4 K_3 K_2 K_1 K_0)$.

The behavior model of the first P/A (parallel addition) circuit 130 is described by the following equations (3) to (10):

$$f_1 = \overline{H_{2A}} H_{1A} \quad (3)$$

$$f_2 = \overline{H_{1A}} H_{0A} \quad (4)$$

$$K_0=(\overline{H_{0A}})(H_{0B})+(f_2)(1)+(f_1)(1)+(H_{2A})(1) \quad (5)$$

$$K_1=(\overline{H_{0A}})(H_{1B})+(f_2)(H_{0B})+(f_1)(1)+(H_{2A})(1) \quad (6)$$

$$K_2=(\overline{H_{0A}})(H_{2B})+(f_2)(H_{1B})+(f_1)(H_{0B})+(H_{2A})(1) \quad (7)$$

$$K_3=(\overline{H_{0A}})(0)+(f_2)(H_{2B})+(f_1)(H_{1B})+(H_{2A})(H_{0B}) \quad (8)$$

$$K_4=(\overline{H_{0A}})(0)+(f_2)(0)+(f_1)(H_{2B})+(H_{2A})(H_{1B}) \quad (9)$$

$$K_5=(\overline{H'_{0A}})(0)+(f_2)(0)+(f_1)(0)+(H_{2A})(H_{2B}) \quad (10)$$

The abacus signal 141 and the abacus signal 142 are the results of the lower beads output.

If the format of the abacus signal 141 is $(L_{2A}L_{1A}L_{0A})$ and the format of the abacus signal 142 is $(L_{2B}L_{1B}L_{0B})$, the total output of both becomes a thermometer code $(K_5K_4K_3K_2K_1K_0)$.

The behavior model of the second P/A (parallel addition) circuit 140 is described by the following equations (11) to (18):

$$f_1=\overline{L_{2A}}L_{1A} \quad (11)$$

$$f_2=\overline{L_{1A}}L_{0A} \quad (12)$$

$$K_0=(\overline{L_{0A}})(L_{0B})+(f_2)(1)+(f_1)(1)+(L_{2A})(1) \quad (13)$$

$$K_1=(\overline{L_{0A}})(L_{1B})+(f_2)(L_{0B})+(f_1)(1)+(L_{2A})(1) \quad (14)$$

$$K_2=(\overline{L_{0A}})(L_{2B})+(f_2)(L_{1B})+(f_1)(L_{0B})+(L_{2A})(1) \quad (15)$$

$$K_3=(\overline{L_{0A}})(0)+(f_2)(L_{2B})+(f_1)(L_{1B})+(L_{2A})(L_{0B}) \quad (16)$$

$$K_4=(\overline{L_{0A}})(0)+(f_2)(0)+(f_1)(L_{2B})+(L_{2A})(L_{1B}) \quad (17)$$

$$K_5=(\overline{L_{0A}})(0)+(f_2)(0)+(f_1)(0)+(L_{2A})(L_{2B}) \quad (18)$$

Figure 2:
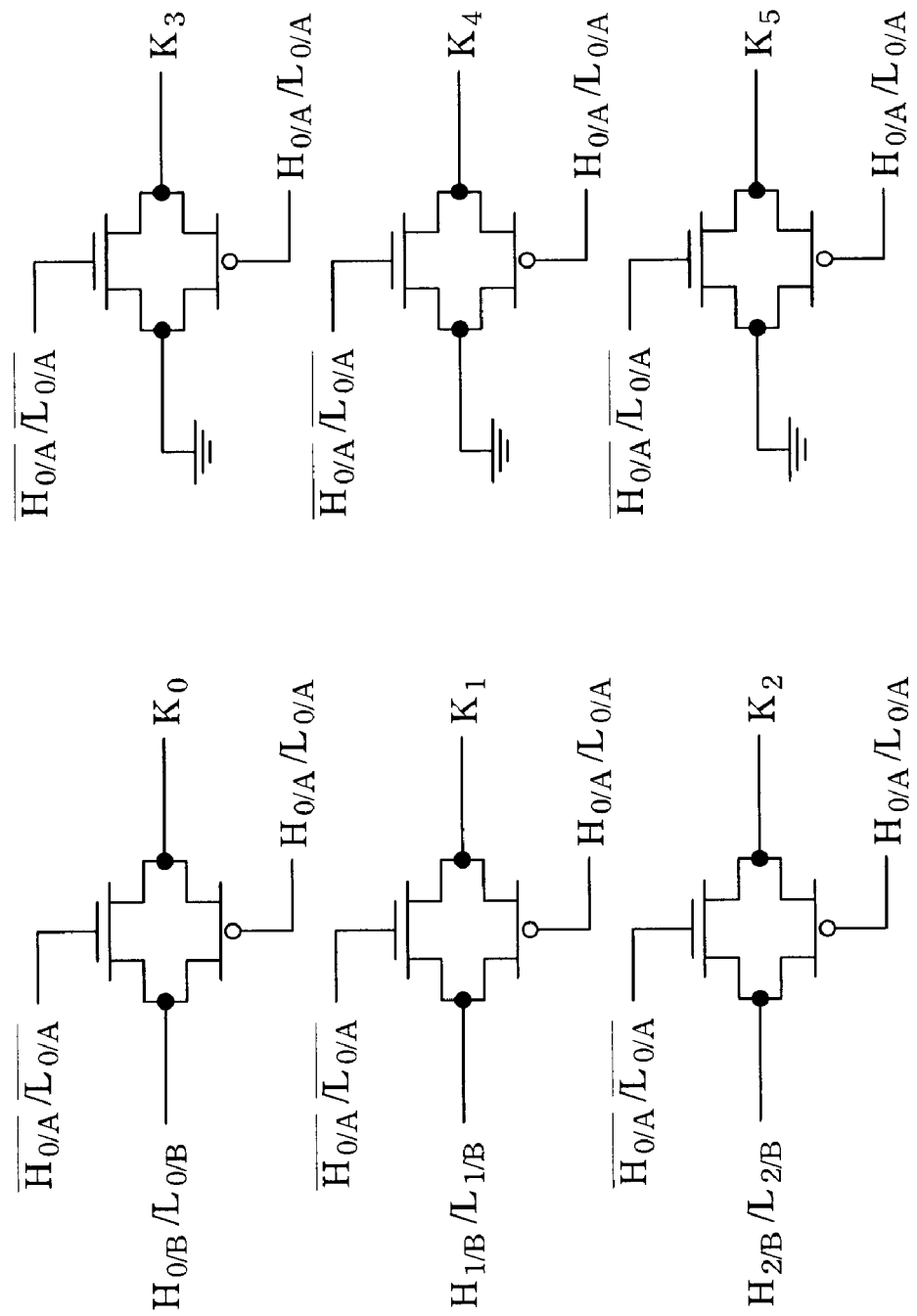
FIG. 2 is a circuit diagram of a parallel addition circuit in accordance with the present invention.
Figure 3:
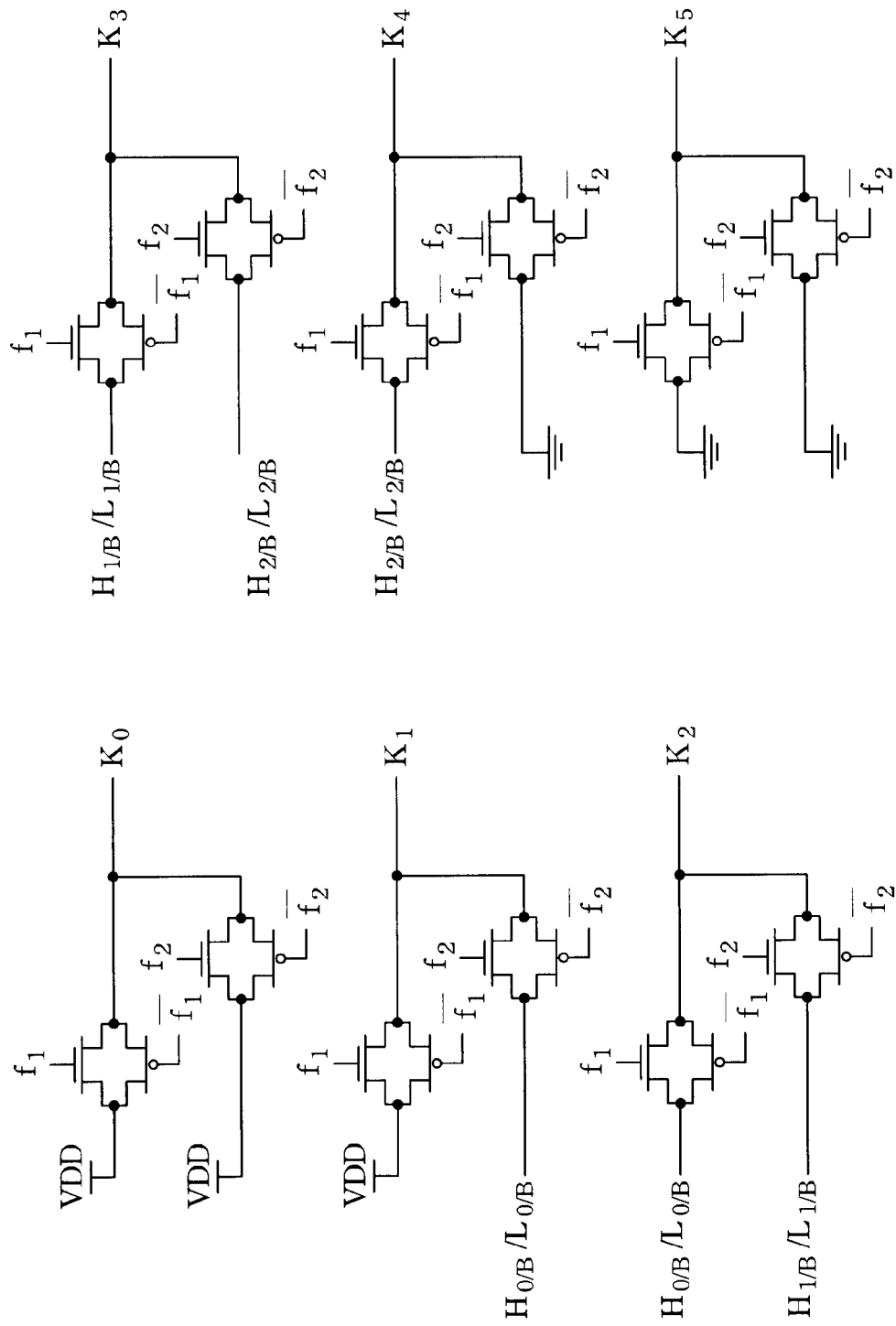
FIG. 3 is a circuit diagram of a parallel addition circuit in accordance with the present invention.
Figure 4:
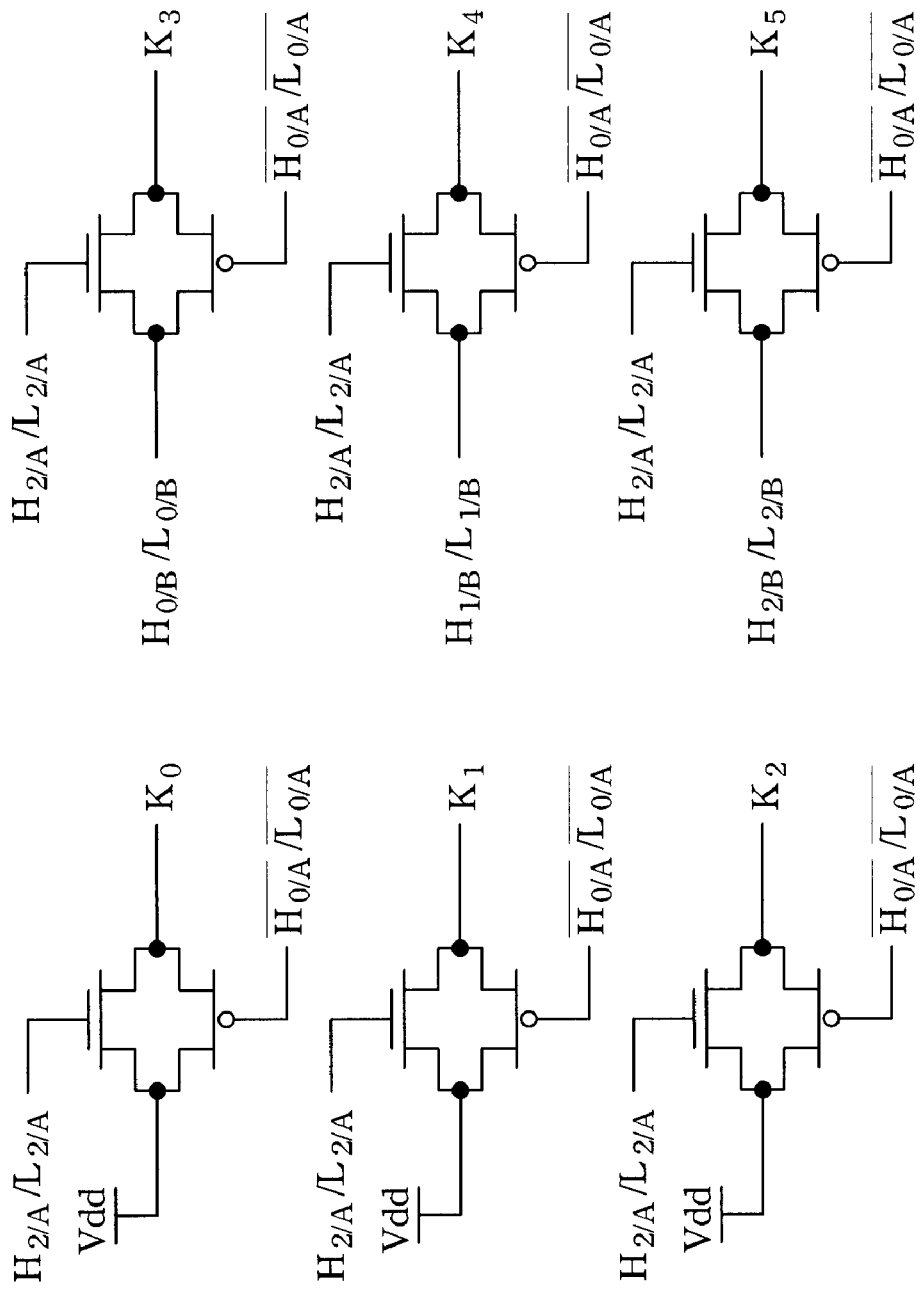
FIG. 4 is a circuit diagram of a parallel addition circuit in accordance with the present invention.

Refer to FIG. 2, FIG. 3 and FIG. 4. FIG. 2, FIG. 3 and FIG. 4 implement the circuit of the equations (3) to (18) above.

The first T/B (thermometric to binary) circuit 150 translates a thermometric signal 151 to a binary signal 152 and outputs a carry signal for the next significant digit 153. The second T/B (thermometric to binary) circuit 160 translates a thermometric signal 161 to a binary signal 162 and outputs a carry signal for a next significant digit 163.

The behavior models of the first T/B (thermometric to binary) circuit 150 and the second T/B (thermometric to binary) circuit 160 are described by the following equations (19) to (21):

$$S_0(\text{or } S_2)=\overline{K_0}C_{in}+\overline{K_1}K_0\overline{C_{in}}+\overline{K_2}K_1C_{in}+\overline{K_3}K_2\overline{C_{in}}+\overline{K_4}K_3\overline{C_{in}}+\overline{K_5}C_{in} \quad (19)$$

$$S_1(\text{or } S_3)=K_5+K_4C_{in}+\overline{K_2}K_0C_{in}+\overline{K_3}K_1\overline{C_{in}} \quad (20)$$

$$C_{out}=K_3+K_2C_{in} \quad (21)$$

Figure 5:
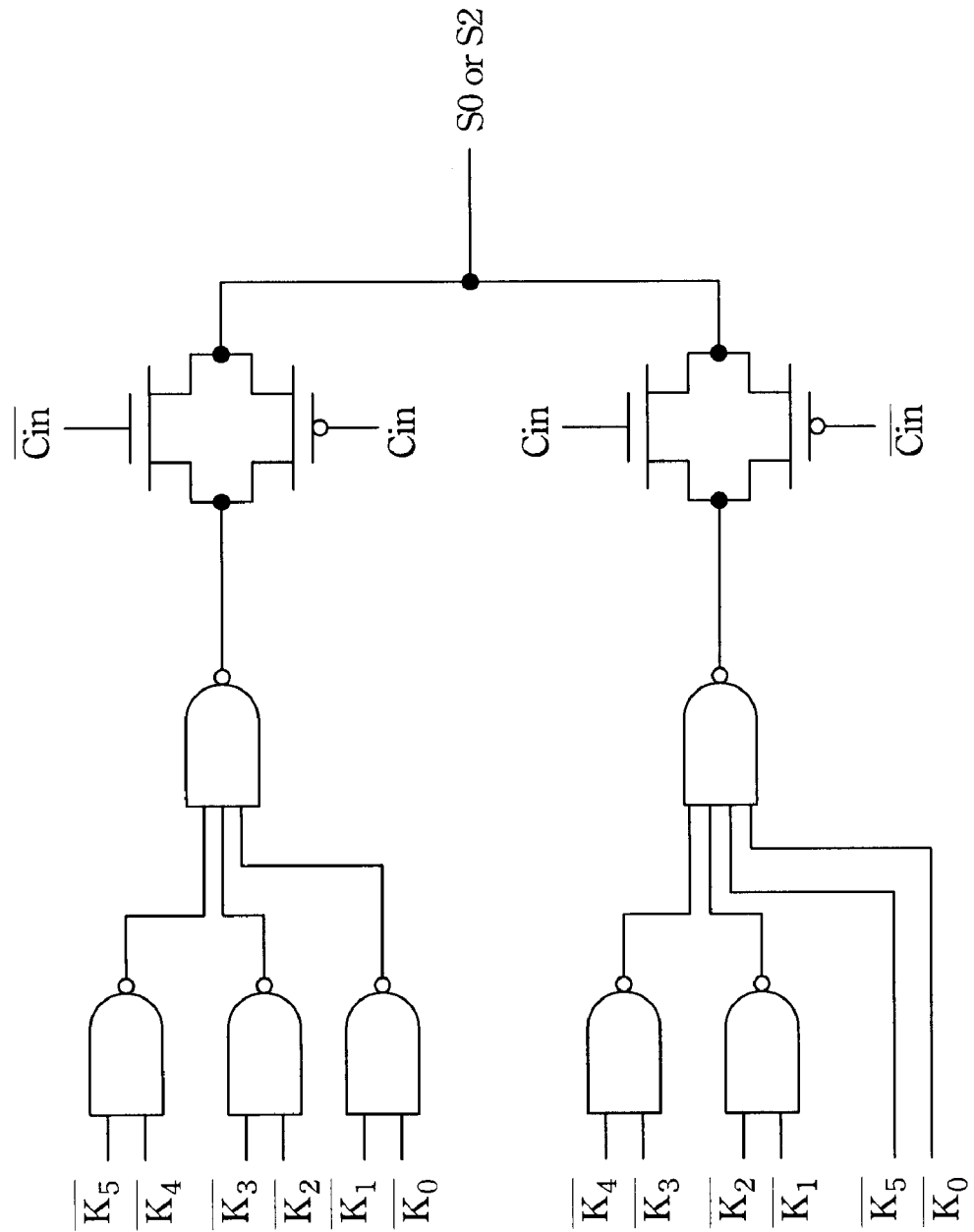
FIG. 5 is a circuit diagram of a T/B (thermometric to binary) circuit in accordance with the present invention.
Figure 6:
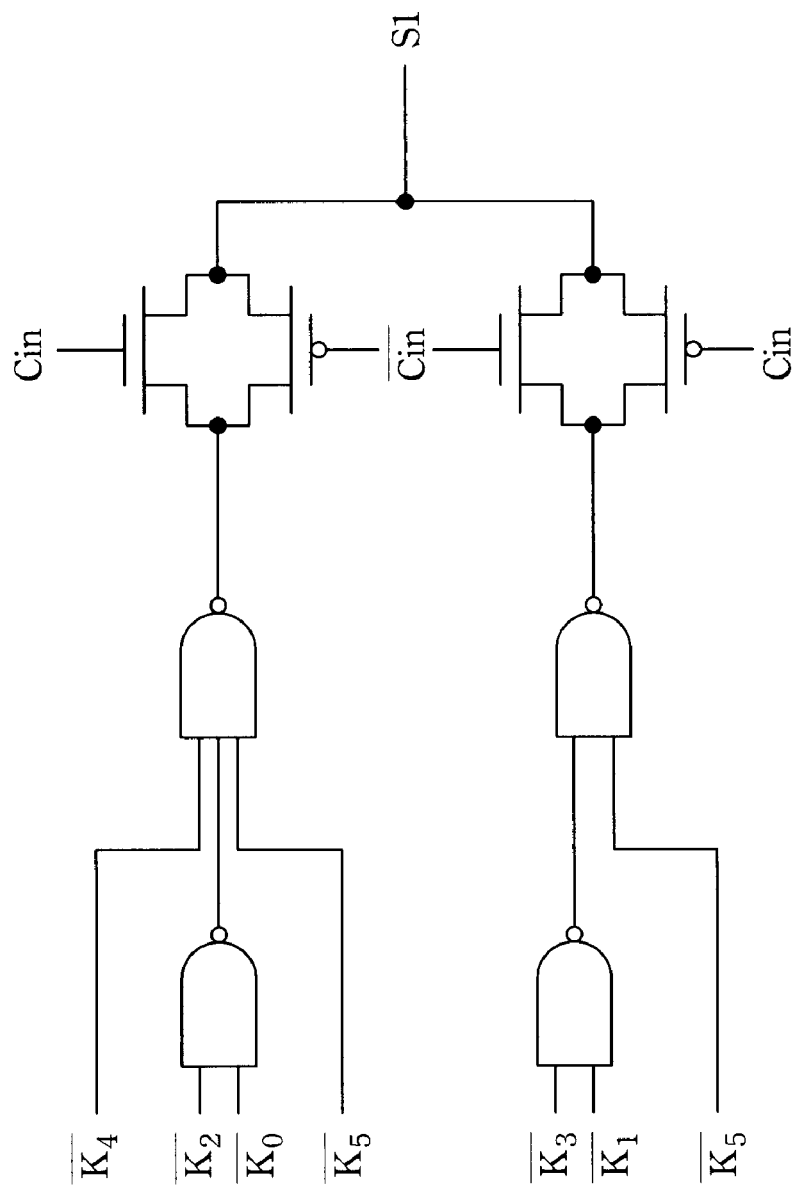
FIG. 6 is a circuit diagram of a T/B (thermometric to binary) circuit in accordance with the present invention.
Figure 7:
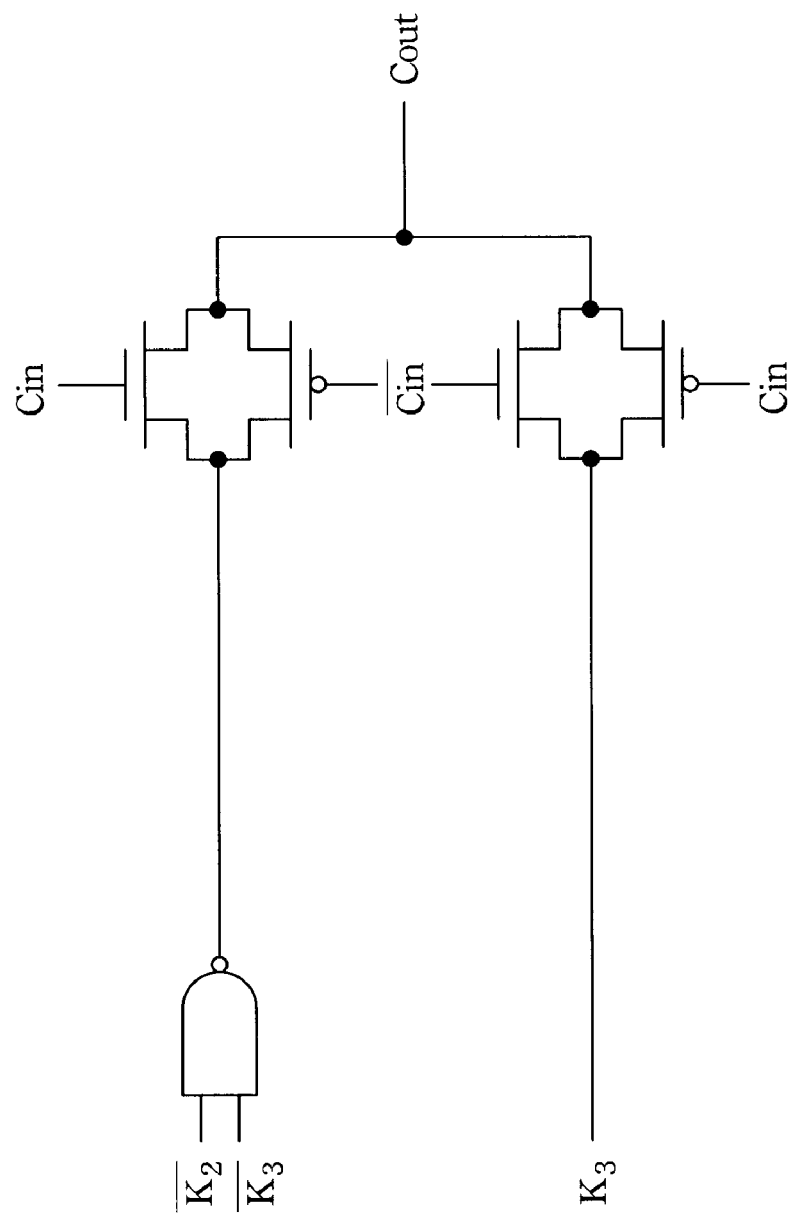
FIG. 7 is a circuit diagram of a T/B (thermometric to binary) circuit in accordance with the present invention.

Refer to FIG. 5, FIG. 6 and FIG. 7. FIG. 5, FIG. 6 and FIG. 7 implement the circuit of the equations (19) to (21) above.

Compare equation (21) and equation (c) described in the "BACKGROUND" section. $K_3$ and $K_2$ in equation (21) have the same function as G and P in the method used to design a high-speed adder in accordance with the prior art.

Figure 8:
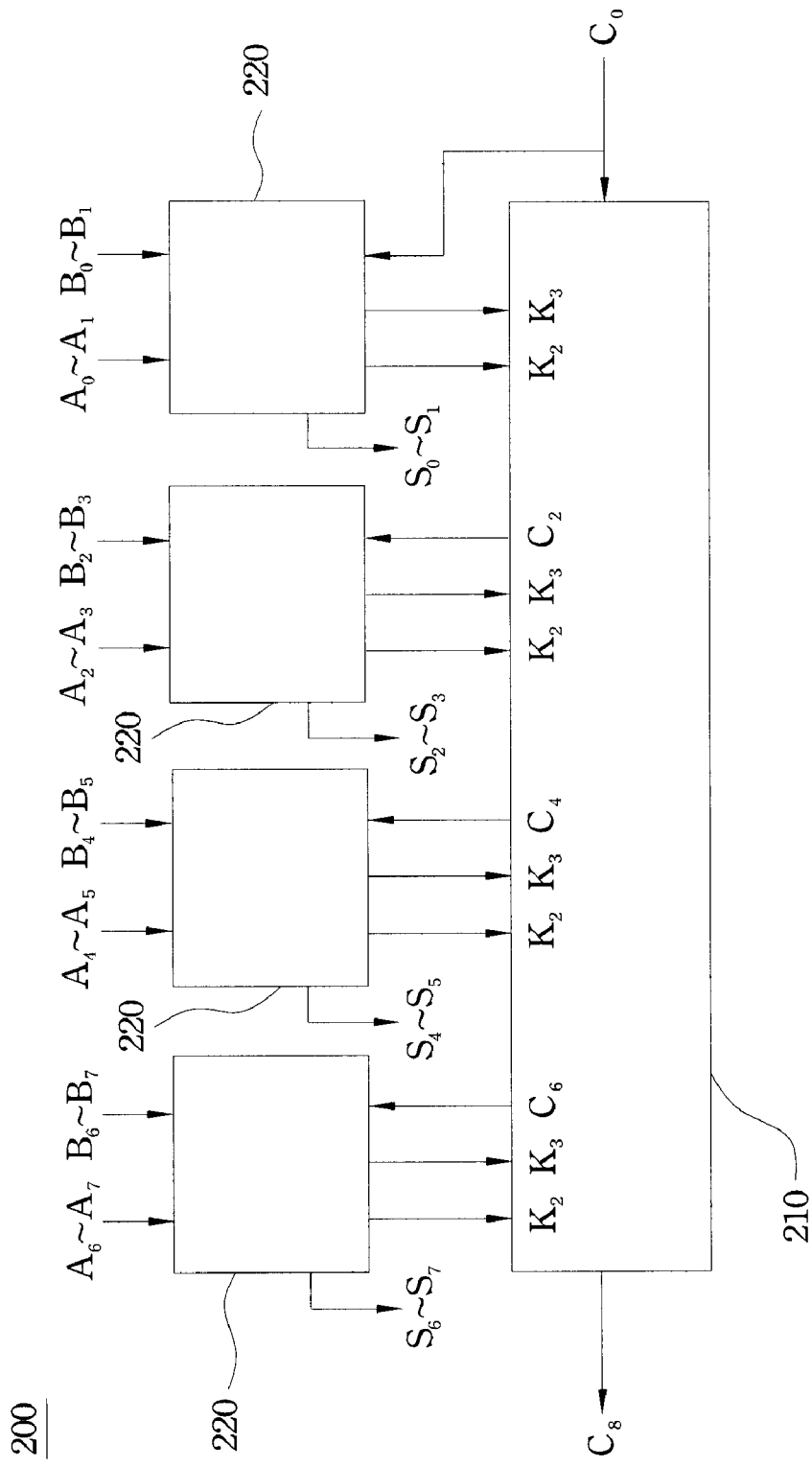
FIG. 8 is an illustration of an 8-bit carry look-ahead abacus adder in accordance with the present invention.

Refer to FIG. 8. FIG. 8 illustrates an 8-bit carry look-ahead abacus adder in accordance with the present invention. In the embodiment, the 8-bit carry look-ahead abacus adder 200 includes a carry generator 210 and a 2-bit abacus adder 220.

The 8-bit carry look-ahead adder consists of the carry generator 210 and four 2-bit abacus adders 220 which include the B/A circuit, the P/A circuit and the T/B circuit. Increasing the numbers of the 2-bit abacus adder 220 to extend as a 2N-bit of a high-bit fast abacus adder (N is a positive integer) by the basic element of the 2-bit abacus adder 220.

The advantages of the present embodiment include:

First, the Chinese abacus adder uses a multiple radix circuit structure, which could reduce the chip area and power consumption.

Second, the circuit structure of the Chinese abacus adder could be easily used in pipeline implementation and reduce the number of times of carry that it could improve operational rate compare to a known fast adder.

Third, the circuit structure of the Chinese abacus adder has excellent extensibility. Because $K_3$ and $K_2$ in equation (21) has the same function as G and P in a known method of designing a high-speed adder, the circuit structure of the carry look-ahead adder and the Chinese abacus adder are combined to extend a high-bit fast abacus adder.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A Chinese abacus adder comprising:
   multiple B/A (binary to abacus) circuits translating respectively binary inputs to hexadecimal abacus signals;
   multiple parallel addition circuits adding the hexadecimal abacus signals to produce respectively thermometric codes; and
   multiple T/B (thermometric to binary) circuits translating respectively the thermometric codes to binary outputs.

2. A 2N-bit carry look-ahead abacus adder comprising:
   a carry generator; and
   at least one abacus adder, each of the at least one abacus adder connected the carry generator and comprising:
   multiple B/A (binary to abacus) circuits translating binary inputs to hexadecimal abacus signals;
   multiple parallel addition circuits adding the hexadecimal abacus signals to produce respectively thermometric codes; and
   multiple T/B (thermometric to binary) circuits translating respectively the thermometric codes to binary outputs.

3. The 2N-bit carry look-ahead abacus adder as claimed in claim 2, wherein N is a positive integer.

* * * * *